US009769372B2

(12) United States Patent
Eguchi (10) Patent No.: US 9,769,372 B2
(45) Date of Patent: Sep. 19, 2017

(54) IMAGE ESTIMATING METHOD INCLUDING CALCULATING A TRANSVERSE CUTOFF FREQUENCY, NON-TRANSITORY COMPUTER READABLE MEDIUM, AND IMAGE ESTIMATING APPARATUS

(71) Applicant: CANON KABUSHIKI KAISHA, Tokyo (JP)

(72) Inventor: Akira Eguchi, Tucson, AZ (US)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 14/638,590

(22) Filed: Mar. 4, 2015

(65) Prior Publication Data
US 2015/0254862 A1 Sep. 10, 2015

(30) Foreign Application Priority Data

Mar. 10, 2014 (JP) ................. 2014-045803

(51) Int. Cl.
*H04N 5/228* (2006.01)
*H04N 5/232* (2006.01)
*G06T 5/50* (2006.01)

(52) U.S. Cl.
CPC ........... *H04N 5/23212* (2013.01); *G06T 5/50* (2013.01); *G06T 2207/10004* (2013.01);
(Continued)

(58) Field of Classification Search
CPC .......... H04N 5/217; G06T 2207/20052; G06T 2207/20056; G06T 5/10; G06T 5/002; G02B 21/367
(Continued)

(56) References Cited

U.S. PATENT DOCUMENTS 4,057,833 A * 11/1977 Braat ................... G11B 7/0906
369/109.01
4,058,780 A * 11/1977 Riblet ....................... H01P 1/39
333/1.1
(Continued)

FOREIGN PATENT DOCUMENTS

JP 2001223874 A 8/2001
JP 2012042525 A 3/2012
(Continued)

OTHER PUBLICATIONS

Yamazoe et al. "Modeling of Through-Focus Aerial Image with Aberration and Imaginary Mask Edge Effects in Optical Lithography Simulation", Applied Optics, vol. 50, No. 20, pp. 3570-3578, Jul. 10, 2011.
(Continued)

Primary Examiner — Antoinette Spinks
(74) Attorney, Agent, or Firm — Rossi, Kimms & McDowell LLP (57) ABSTRACT

The image estimating method is configured to estimate, using image data generated by capturing an object via an image-pickup optical system at a plurality of positions that are spaced at first intervals in an optical-axis direction of the image-pickup optical system, image data at a position different from the plurality of positions. The image estimating method includes an image acquiring step of acquiring image data, a frequency analyzing step of calculating a transverse cutoff frequency in a direction perpendicular to the optical-axis direction based on the image data acquired in the image acquiring step, and an interval calculating step of calculating the first interval based on the transverse cutoff frequency calculated by the frequency analyzing step.

12 Claims, 6 Drawing Sheets

(52) U.S. Cl.
CPC ............... *G06T 2207/10056* (2013.01); *G06T 2207/10148* (2013.01); *G06T 2207/20052* (2013.01); *G06T 2207/20056* (2013.01); *G06T 2207/30024* (2013.01); *H04N 2201/0039* (2013.01)

(58) Field of Classification Search
USPC .............. 348/222.1; 382/275, 264, 260, 154
See application file for complete search history.

(56) References Cited

U.S. PATENT DOCUMENTS

| | | | | |
|---|---|---|---|---|
| 4,866,647 | A * | 9/1989 | Farrow | G06F 17/17 708/313 |
| 4,896,285 | A * | 1/1990 | Ishikawa | H03H 17/06 708/300 |
| 5,021,756 | A * | 6/1991 | Tajima | H03H 11/04 330/286 |
| 5,706,402 | A * | 1/1998 | Bell | G06K 9/6242 706/22 |
| 2004/0034514 | A1 * | 2/2004 | Langemyr | G06F 17/12 703/2 |
| 2015/0062325 | A1 | 3/2015 | Eguchi | |

FOREIGN PATENT DOCUMENTS

| | | | |
|---|---|---|---|
| JP | 2013239061 A | * | 11/2013 |
| JP | 2014002636 A | | 1/2014 |
| WO | 2013172477 A1 | | 11/2013 |

OTHER PUBLICATIONS

Sheppard et al. "Three-Dimensional Transfer Functions for High-Aperture Systems", Journal of the Optical Society of America, vol. 11, No. 2, pp. 593-598, Feb. 1, 1994.

* cited by examiner

IMAGE ESTIMATING METHOD INCLUDING CALCULATING A TRANSVERSE CUTOFF FREQUENCY, NON-TRANSITORY COMPUTER READABLE MEDIUM, AND IMAGE ESTIMATING APPARATUS

BACKGROUND OF THE INVENTION

Field of the Invention

The present invention relates to an image estimating method, a non-transitory computer readable medium, and an image estimating apparatus, for estimating an image at an arbitrary focus position.

Description of the Related Art

In the virtual slide system, a digital image-pickup apparatus called a virtual slide is used to obtain a digital image of an object. In the medical field, an object is generally formed as a prepared specimen in which a sample is covered and fixed by an optical element (a cover glass). The virtual slide includes a microscope optical system, an image sensor, and an information processor, converts a prepared specimen into a digital image, and stores its data. Since this type of device stores only a digital image of the prepared specimen, a viewable image after the pickup is only an image at a focus position used for the pickup. Since a doctor frequently needs to determine a three-dimensional structure of the sample based on a series of images having different focus positions, it is necessary to capture a plurality of (stacked) images at different focus positions.

Acquiring many images requires a remarkably long image pickup time and a large data amount. Thus, minimizing the image pickup number is demanded. On the other hand, the excessively reduced image pickup number may result in a failure to provide an image at a focus position desired by a doctor in his diagnosis. In order to reconcile these two requirements, i.e., the reduced image pickup number and a provision of an image at an arbitrary focus position, there has been proposed a method for estimating an image at a necessary focus position through image processing.

Japanese Patent Laid-Open No. ("JP") 2001-223874 proposes an image estimating method that applies a defocus filter in an optical system to images acquired at a plurality of focus positions. Kenji Yamazoe and Andrew R. Neureuther, "Modeling of through-focus aerial image with aberration and imaginary mask edge effects in optical lithography simulation," Applied Optics, Vol. 50, No. 20, pp. 3570-3578, 10 Jul. 2011, U.S.A., discloses an approximately image estimating method that represents an image with a function of a focus position z and performs a polynomial expansion of z.

In order to minimize the image pickup number, it is necessary to widen an interval between two adjacent focus positions. However, the image estimating precision may lower when the image acquiring interval becomes excessively wide. In order to provide an image demanded by a doctor using a smaller number of images, the image acquiring interval may be maximized in a range in which the estimation precision is guaranteed.

Yamazoe et al. supra, and JP 2012-42525 propose setting an image acquisition interval to a value determined by the optical system. C. J. R. Sheppard, Min Gu, Y. Kawata and S. Kawata, "Three-dimensional transfer functions for high-aperture systems," Journal of the Optical Society of America A, Vol. 11, No. 2, pp. 593-598, 1 Feb. 1994, U.S.A. describes a calculation method of a cutoff frequency.

The method disclosed in JP 2001-223874 needs to previously identify a defocus filter in the optical system, and requires a complicated preliminary measurement etc. In addition, this method is inapplicable to a partial coherent imaging system as in a microscope. The method disclosed in Yamazoe et al. supra, uses the polynomial of z as the function used for the expansion, and obtains an image as an approximated solution. The polynomial expansion up to a high order becomes necessary to improve the precision of the approximation, but then an extremely long calculation time is required. Moreover, the image acquiring interval determined only based on the information of the optical system depends upon the finest resolving power in the optical system. As a result, images are obtained at excessively narrow intervals, and a data capacity reducing effect becomes lower.

SUMMARY OF THE INVENTION

The present invention provides an image estimating method, a non-transitory computer readable medium, and an image estimating apparatus, which can easily and precisely estimate an image at an arbitrary position with a small data amount.

An image estimating method according to the present invention is configured to estimate, using image data generated by capturing an object via an image-pickup optical system at a plurality of positions that are spaced at first intervals in an optical-axis direction of the image-pickup optical system, image data at a position different from the plurality of positions. The image estimating method includes an image acquiring step of acquiring image data, a frequency analyzing step of calculating a transverse cutoff frequency in a direction perpendicular to the optical-axis direction based on the image data acquired in the image acquiring step, and an interval calculating step of calculating the first interval based on the transverse cutoff frequency calculated by the frequency analyzing step.

Further features of the present invention will become apparent from the following description of exemplary embodiments with reference to the attached drawings.

DESCRIPTION OF THE EMBODIMENTS

This embodiment relates to an image estimating method configured to estimate, using image data generated by capturing an object via an image-pickup optical system at a plurality of positions that are spaced at first intervals (predetermined intervals) $\Delta z$ in an optical-axis direction of the image-pickup optical system, image data at a position different from the plurality of positions. This embodiment relates to a method for properly setting the first interval $\Delta z$ that is an image acquiring interval. The image estimating method can be implemented as a computer executable program, which may be stored in a recording medium, such as a non-transitory computer-readable medium.

The image estimation may be executed in the image-pickup apparatus or in an image estimating apparatus (computer) connected to a storage unit (or memory) configured to store images in the image-pickup apparatus. The image-pickup apparatus may serve as an image estimator. The image estimation may be executed by using the cloud computing. A network device connected to a computer on a network (or cloud) may input information necessary to estimate the image, such as a focus position, and receive an estimated result and known data. The network device may be a computer that includes an input unit configured to designate (input) the focus position etc., and a communication unit used to receive image data. For example, the network device may be a desktop personal computer ("PC"), a cellular phone, a laptop PC, and dedicated machine, such as a PDA. The network device may include an integrated display unit or may be connected to an external display unit. Thereby, a remote diagnosis is available.

Figure 1:
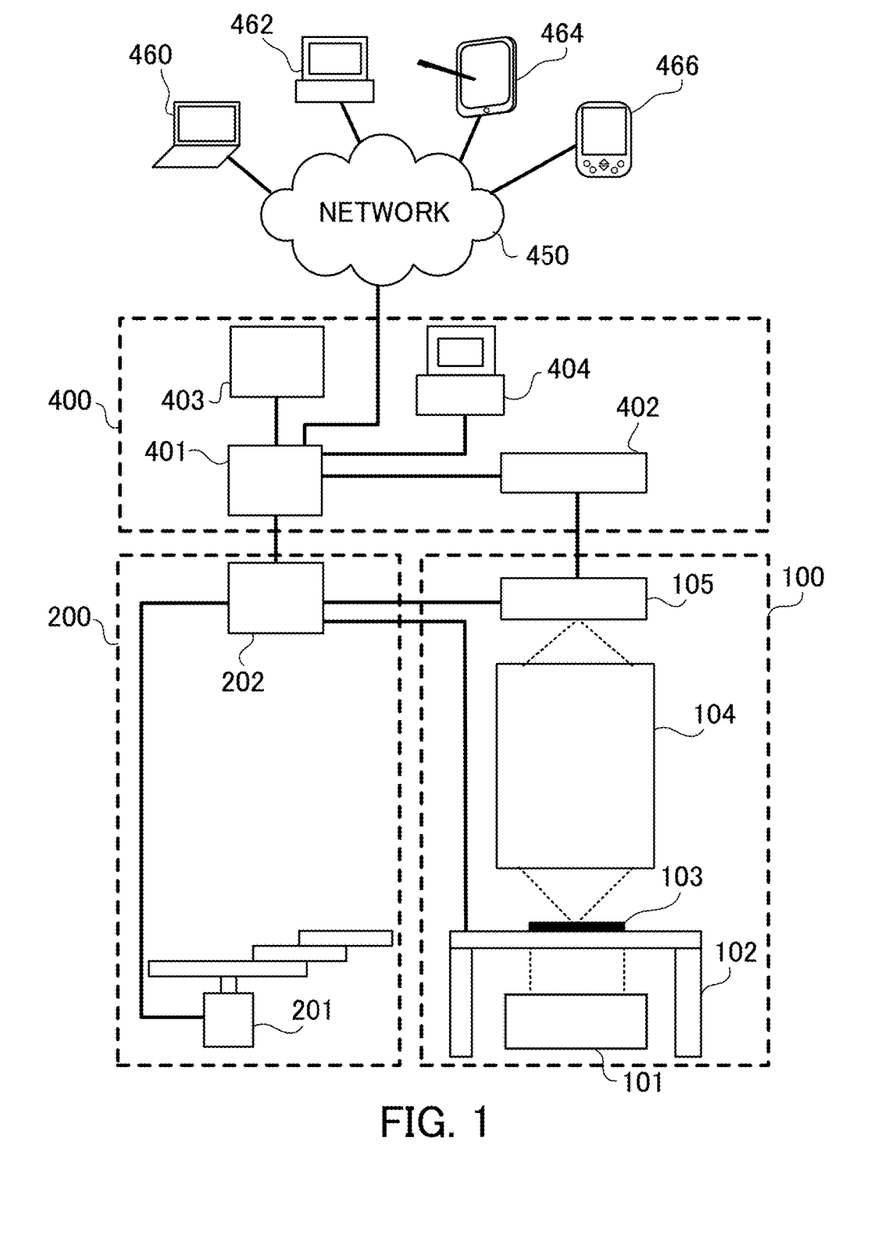
FIG. 1 is a block diagram of a virtual slide according to the present invention.

FIG. 1 is a block diagram of a virtual slide according to this embodiment. The virtual slide includes an image-pickup unit (image-pickup apparatus) 100, a control unit 200, and an information processing unit (image estimating apparatus) 400.

The control unit 200 includes a feeder 201, and a controller 202. The feeder 201 moves an object 103 onto a movable stage 102 based on an instruction of the controller 202. The movable stage 102 can move in the optical-axis direction in accordance with an instruction from the controller 202. The movable stage 102 may move in a direction perpendicular to the optical axis. By using the movable stage 102, images can be acquired at focus positions different from each other.

The image-pickup unit 100 is an apparatus configured to acquire an image of the object 103, and includes an illumination optical system 101, the movable stage 102, an (image-pickup) optical system 104, and an image sensor 105.

The illumination optical system 101 illuminates the object 103 mounted on the movable stage 102, and the optical system 104 forms an enlarged optical image of the object on the image sensor 105. The image sensor 105 is a photoelectric conversion element configured to photoelectrically convert the enlarged optical image of the object. An electric signal output from the image sensor 105 is transmitted as image data to the information processing unit 400.

The information processing unit 400 includes a computer (processor) 401, an image processor 402, a data storage (memory) 403, and a display unit 404.

The image processor 402 converts image data sent from the image sensor 105, into a digital signal. This digital signal will be referred to as a luminance signal (or a brightness signal). The image processor 402 performs image processing, such as noise reduction and compression, for image data that has been converted into the luminance signal, and transmits the processed signal to the computer 401. The computer 401 sends the received image data to the data storage 403. The data storage 403 stores the received image data.

In the diagnosis, the computer 401 reads the image data out of the data storage 403. The computer 401 performs image processing for read image data so as to turn it into image data at a focus position designated by a user. The converted image data is sent to the display unit 404 so as to display the image.

The computer 401, the image processor 402, the data storage 403, the display unit 404, and the controller 202 may be integrated in one computer. The data may be stored in an external server (not illustrated) connected to the network 450, so that many people at remote locations can access the data. The computer 401 is connected to a variety of network devices via the network 450. These network devices may include a laptop PC 460, a desktop PC 462, a portable terminal 464 having a touch-tone screen, and a dedicated terminal 466, such as a PDA.

The network device includes an operating unit, a display unit, a designation unit, a communication unit, and a storage unit. The operating unit may be a computer or a processor, and controls each component and performs necessary operations. The display unit may be integrated with a housing of the network device, such as the network devices 460, 464 and 466, or may be connected to the network device, as in the network device 462. The designating unit includes an input unit, such as a touch-screen, a keyboard, a stylus pen, and a mouse, which is configured to enable a user to designate an arbitrary position z (or the focus position) in the optical-axis direction of the optical system for the movable stage 102. The communication unit is connected to the network 450, sends information of the position z to the image estimating apparatus, and receives information of the image data of the object at the position z from the image estimating apparatus. The information of the image data may be a still image in a jpeg format, etc. The storage unit includes a memory configured to store an application program that enables to designate the position z. The network devices 460, 464, and 466 further include a display unit configured to display an image at the position z based on the information of the received image data via the communication unit.

Figure 2:
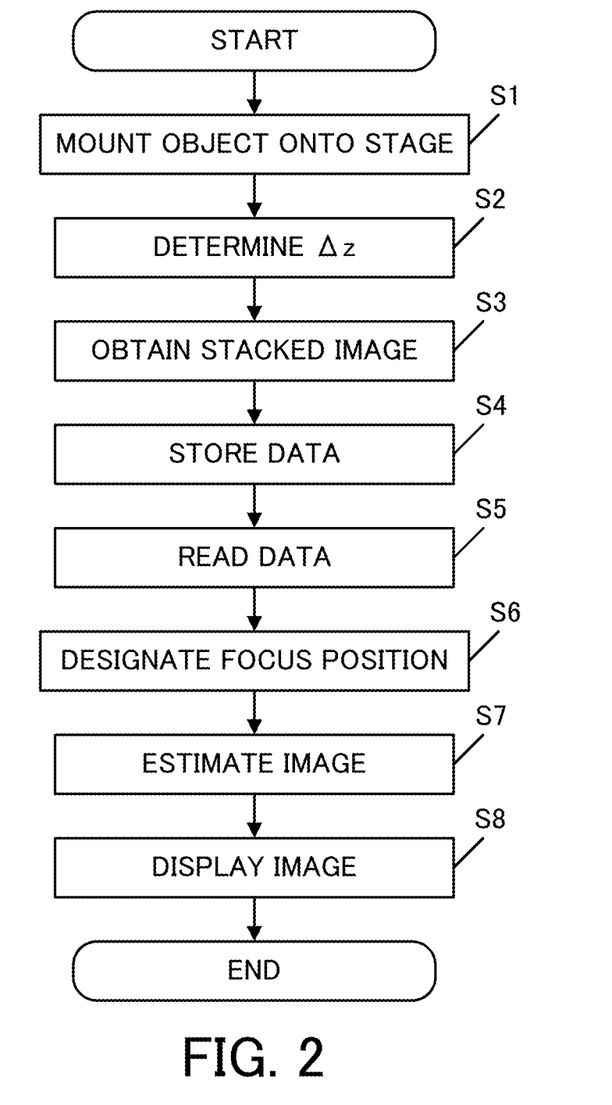
FIG. 2 is a flowchart from image acquisition to image display of an object according to this embodiment.

FIG. 2 is a flowchart from an installation to a display of the object 103. Herein, "S" denotes the step, and this is applied to another flowchart. Acquisition of an enlarged image of the object 103 as image data using the image sensor 105, the image processor 402, and the computer 401 will be referred to as image acquisition. Assume that $\Delta z$ is the first interval by which the focus position is changed.

In S1, the feeder 201 mounts the object 103 onto the movable stage 102. In S2, $\Delta z$ suitable for the object 103 is determined by the image processing unit. The detail of S2 will be described later. In S3, the stacked images of the object 103 are obtained. In S4, the obtained stacked images are stored in the data storage 403. In the diagnosis, the stored data is read out in S5. When the image acquisition of the object 103 and the diagnosis simultaneously occur, the data storage may be temporary. In S6, the user sets a desired focus position. The focus position may be set by reading a preset value or by calculating a surface shape of the object obtained in the preliminary measurement. In S7, the image at the set focus position is estimated. In S8, the estimated image is sent to the display unit 404 so as to display the image. The image acquisition and image display of the object 103 are thus performed.

A value of $\Delta z$ which guarantees the image estimating precision depends upon the object, as described later. In S2, $\Delta z$ is determined by analyzing the spectrum of the object image.

Figure 3:
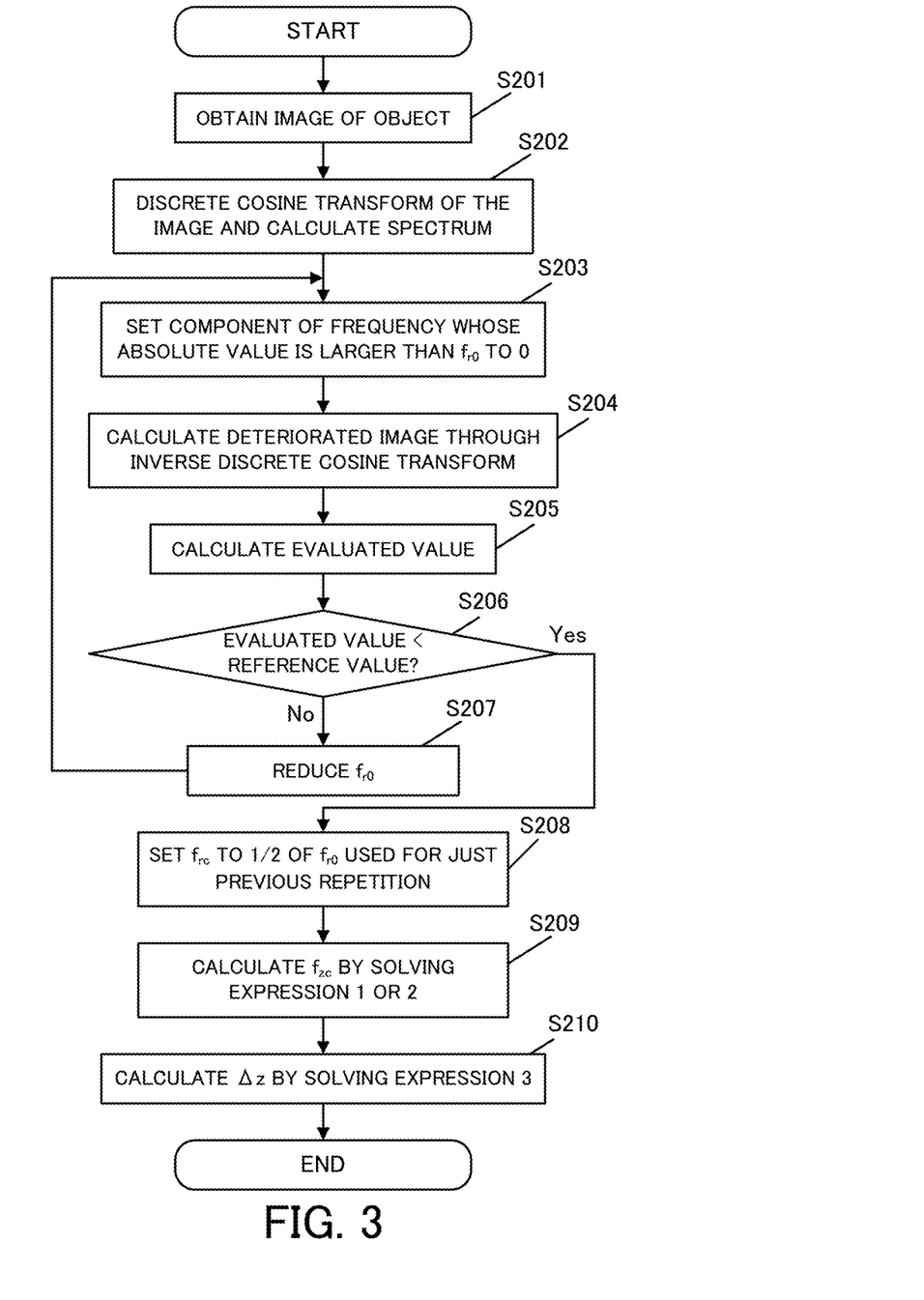
FIG. 3 is a flowchart for determining an image acquiring interval $\Delta z$ according to this embodiment.

A flowchart illustrated in FIG. 3 describes a determining method of $\Delta z$ in S2.

Initially, in S201 (image acquiring step), the image data of the object 103 is obtained with the image-pickup unit 100. In S202, a discrete cosine transform is performed for the obtained image, and the spectrum is calculated. In S203, the spectrum is set to 0 or attenuated in a region in which an absolute value of a spatial frequency is higher than $f_{r0}$. An initial value of the first value (predetermined value) $f_{r0}$ as the characteristic of the filter is not particularly limited as long as it is larger than $2NA/\lambda$, where NA is a numerical value of the optical system and $\lambda$ is a wavelength of light from the object. In S204, an inverse cosine transform is performed so as to calculate the deteriorated image. S202 to S204 provide the deteriorated image to which a low-pass filter has been applied, and thus serve as a filtering step of filtering the image data obtained in S201.

In S205 (evaluated value calculating step), an evaluated value of the deteriorated image is calculated. An evaluated value may be a brightness dispersed value of the image, a structural similarity ("SSIM"), a peak signal to noise ratio ("PSNR"), an integrated value of a spectrum, or another evaluation index.

In S206, the evaluated value is compared with a reference value. The reference value is a value used to determine the quality of the estimated image. The reference value may be freely set by the user or set by reading a pre-stored value. The reference value may be a value that provides a good quality image, such as PSNR of about 35 [dB]. When the evaluated value is higher than the reference value, the characteristic of the filter is changed by reducing $f_{r0}$ (S207), and S203 to S206 are repeated. An amount for reducing $f_{r0}$ may be about a sampling width of the frequency space determined by the image size.

When the evaluated value becomes lower than the reference value representative of the permissible value of the quality of the estimated image, the repetition is stopped and the flow moves to S208 (frequency analyzing step). $f_{r0}$ used for the just one previous repetition can be regarded as a spatial frequency (cutoff frequency) at which the deterioration of the image can be permissible. The above steps hitherto are based on the cosine transform theory, but the subsequent steps are based on the Fourier transform theory. Since the frequency used for the cosine transform is twice as high as that used for the Fourier transform, a value made by dividing $f_{r0}$ used for the just one previous repetition by 2 is set to the (transverse) cutoff frequency $f_{rc}$ in the direction perpendicular to the optical axis (S208). In S208, a minimum value of the transverse cutoff frequency at which the evaluated value is equal to or higher than the reference value is calculated by repeating S203 to S205 while changing the filter characteristic. The minimum value may be calculated based on discretely updated $f_{r0}$, or $f_{r0}$ at which the evaluated value is equal to the reference value may be calculated by the interpolation method.

S209 is a frequency converting step of calculating a (longitudinal) cutoff frequency in the optical-axis direction, based on $f_{rc}$ that has been obtained by S201 to S208. $f_{zc}$ can be calculated by solving Expression 1 or 2. NA is a numerical aperture of the optical system 104, and $\lambda$ is a wavelength of the light used for the optical system 104. When $f_{rc}$ is smaller than $NA/\lambda$, Expression 1 is solved to calculate $f_{zc}$. When $f_{rc}$ is equal to or larger than $NA/\lambda$, Expression 2 is solved to calculate $f_{zc}$.

$$f_{zc} = \frac{\sqrt{1-(f_{rc}\lambda - NA)^2} - \sqrt{1-NA^2}}{\lambda} \quad \text{Expression 1}$$
$$\text{if}$$
$$f_{rc} < \frac{NA}{\lambda}$$

$$f_{zc} = \frac{1 - \sqrt{1-NA^2}}{\lambda} \quad \text{Expression 2}$$
$$\text{if}$$
$$f_{rc} \geq \frac{NA}{\lambda}$$

Expressions 1 and 2 are lead out of Expression 13 in Sheppard et al. supra. In S210, (interval calculating step), the image acquiring interval $\Delta z$ is calculated from $f_{zc}$ calculated in S209. Due to the sampling theorem, Expression 3 defines maximum $\Delta z$ used to properly obtaining data with the cutoff frequency $f_{zc}$.

$$\Delta z = \frac{1}{2f_{zc}} \quad \text{Expression 3}$$

When the stacked images are obtained with $\Delta z$ determined by the above procedure, a data capacity can be effectively restrained. While this embodiment calculates the longitudinal cutoff frequency $f_{zc}$ as an intermediate value, a calculation of the intermediate value may be omitted by substituting $f_{zc}$ in Expression 3 for Expression 1 or 2. In other words, it is sufficient that this embodiment calculates the first interval $\Delta z$ based on the calculated $f_{r0}$.

A description will be given of the reason why necessary $\Delta z$ changes depending upon the object. According to Sheppard, et al. supra, the three-dimensional spectrum of the stacked images exists only in a white area illustrated in FIG. 4. Herein, $f_r$ (abscissa axis) is a spatial frequency in the direction perpendicular to the optical axis, and $f_z$ (ordinate axis) is a spatial frequency in the optical-axis direction. $f_r$ is normalized by $NA/\lambda$, and $f_z$ is normalized by $2(1-(1-NA^2)^{1/2})/\lambda$.

When an increase of a data amount is permitted, a value that is slightly smaller than calculated $\Delta z$ may be employed as the first interval $\Delta z$. For example, $\Delta z$ may be selected in a range determined by an upper limit calculated based on $f_{r0}$ and a lower limit calculated by multiplying the upper limit by 30%.

Figure 4:
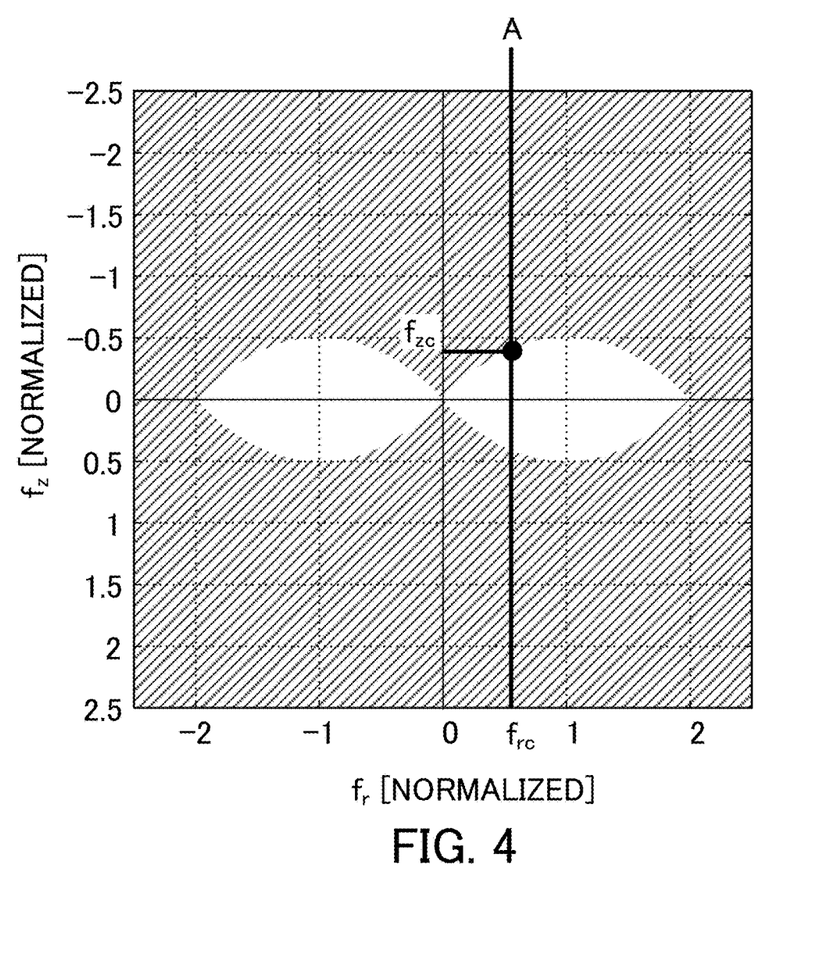
FIG. 4 is a view for explaining a three-dimensional spectrum of stacked images.

When the absolute value of $f_r$ is smaller than $NA/\lambda$, the white area more widely spreads in the $f_z$ direction as the absolute value of $f_r$ increases. In other words, when the absolute value of $f_r$ is small, the spread of the three-dimensional spectrum in the $f_z$ direction becomes narrow. In other words, the area in which the spectrum of the object in the $f_r$ direction exists becomes a lower frequency, the spread of the spectrum in the $f_z$ direction becomes narrower. This means that in the real space, as the structure of the object in the direction perpendicular to the optical axis becomes rougher, the spread of the image in the optical-axis direction becomes wider or $\Delta z$ can be made larger. This is the reason why $\Delta z$ differs according to the object.

Now assume that the transverse cutoff frequency $f_{rc}$ of the object is located on a line A illustrated in FIG. 4. Then, the longitudinal cutoff frequency $f_{zc}$ can be calculated from the intersection (black dot illustrated in FIG. 4) between the line A and the borderline of the white area. Since Expression represents the borderline in the first quadrant in the white area, $f_{zc}$ can be calculated by substituting $f_{rc}$ calculated by S208 for Expression 1. Since $f_z$ becomes maximum when $f_r$ becomes $NA/\lambda$, Expression 2 is used when $f_{rc}$ is larger than $NA/\lambda$. Once $f_{zc}$ is found, necessary $\Delta z$ can be readily found based on Expression 3 with the sampling theorem and proper Δz can be calculated by analyzing the image of the object.

While this method illustratively obtains the transverse cutoff frequency $f_{rc}$ using S201 to S208, the purpose of the previous steps is to obtain the transverse cutoff frequency $f_{rc}$ of the object. A method for finding $f_{rc}$ is not limited to the illustrated method.

For example, instead of capturing an image of the object in S201, the image of the sample at the same site with the same disease may be read out. Since the spectrum of the object at the same site with the same disease is likely to resemble, $f_{rc}$ can be estimated even though there is no image pickup. Since the existing image is usable, the image data that has been already owned by the doctor can be utilized. The transverse cutoff frequency may be calculated based on the typical size of the observation object. In this case, the observation object may be modelled like a circle or eclipse and the modelled image may be read in S201.

A description will be given of the image estimating method performed in S7. Initially, the principle will be described. Now assume I(x, y, z) is a luminance value distribution (or brightness distribution) of the stacked images. A (complex) Fourier series expansion is performed for I(x, y, z) with respect to z according to Expression 4.

$$I(x, y, z) = \sum_{-N/2 \le n < N/2} I'(x, y; f_{zn}) \exp(-2\pi i f_{zn} z) \quad \text{Expression 4}$$

Herein, i denotes an imaginary unit. The spatial frequency $f_z$ is a discrete value expressed by $f_{zn}=n/(z_{max}-z_{min}+\Delta z)$. $z_{max}$ is maximum z to acquire an image, $z_{min}$ is minimum z to acquire the image, $z_j$ is a position z at which an image is acquired, n is an integer that designates a Fourier coefficient I'(x,y;$f_{zn}$) and satisfies $-N/2 \le n < N/2$. N is the image pickup number and is 2 or larger. I'(x,y;$f_{zn}$) is a (complex) Fourier coefficient obtained from image data I(x,y,$z_j$) obtained at different focus positions. The Fourier coefficient can be calculated by a discrete Fourier transform in Expression 5 due to the orthogonality of exp($-2\pi i f_{zn} z$).

$$I'(x, y, f_{zn}) = \sum_{j=1}^{N} I(x, y, z_j) \exp(2\pi i f_{zn} z_j) \quad \text{Expression 5}$$

When a desired z is substituted for Expression 4, an image at a desired position can be calculated. The image estimation procedure is thus as follows. Initially, a Fourier coefficient I'(x,y;$f_{zn}$) (converted image data) is calculated by using a discrete Fourier transform (frequency convert in the optical-axis direction) illustrated in Expression 5 and the luminance value distribution of the obtained stacked image (image data at a plurality of positions). Next, the obtained Fourier coefficient I'(x,y;$f_{zn}$) is multiplied by a complex coefficient exp($-2\pi i f_{zn} z$) determined by the image calculating position z and the spatial frequency $f_{zn}$, and a sum is calculated in $-N/2 \le n < N/2$. This operation can provide an image at a desired position z.

The image estimating method is not limited to the above method. For example, the function used for the series expiation in Expression 4 may be a cos or sin function. For instance, image data at a plurality of positions may be multiplied by sinc(($z-z_j$)/$\Delta z$) and summed up. Alternatively, the method described in Yamazoe et al. supra may be used.

S208 attributes to a difference between the frequency conversion up to S207 and the frequency conversion used to lead out Expression 1. Thus, the operation differs according to the method of calculating $f_{rc}$. For example, when the discrete Fourier transform is performed in S202, S208 may be omitted.

Δz calculated in this embodiment may be stored in the data storage with the information of the object. Thus, a new calculation of Δz becomes unnecessary to obtain an image at the same site.

While this embodiment uses Expression 1 or 2 for an expression that converts $f_{rc}$ into $f_{zc}$, the present invention is not limited to this embodiment. For example, Expressions 6 and 7 that are approximations of Expressions 1 and 2 may be used in an optical system in which the paraxial approximation is sufficiently established (NA<<1).

$$f_{zc} = NA f_{rc} - \frac{\lambda f_{rc}^2}{2} \quad \text{Expression 6}$$

if $$f_{rc} < \frac{NA}{\lambda}$$

$$f_{zc} = \frac{NA^2}{2\lambda} \quad \text{Expression 7}$$

if $$f_{rc} \ge \frac{NA}{\lambda}$$

This embodiment sets $f_{rc}$ to $f_{r0}$/2 in S208 but the present invention is not limited to this embodiment. ½ is necessary because the base frequency conversion is different in each step. In implementing the present invention using another frequency conversion, the frequency of each step may be adjusted according to the frequency conversion. While Expression 3 is used to calculate Δz in S210, the expression used for this step may differ according to the frequency conversion.

In the following embodiment, the image-pickup apparatus and image-pickup method of the invention, the effects of the invention, and a further applied method will be described in detail with reference to the drawings.

First Embodiment

A description will now be given of an image estimating method at an arbitrary focus position according to a first embodiment. Assume, as conditions of the optical system in this embodiment, that an image-pickup optical system has a numerical aperture NA of 0.25, an imaging magnification is 10 times, and light has a wavelength λ of 650 nm and is monochromatic. Moreover, assume that a partial coherent illumination is used, and a numerical aperture of the illumination optical system NAi satisfies NAi/NA=0.7. A description will be given of a concrete method for determining Δz according to the flowcharts illustrated in FIGS. 2 and 3, and for displaying an image at an arbitrary position. This embodiment exhibits effects through numerical simulations.

Figure 5:
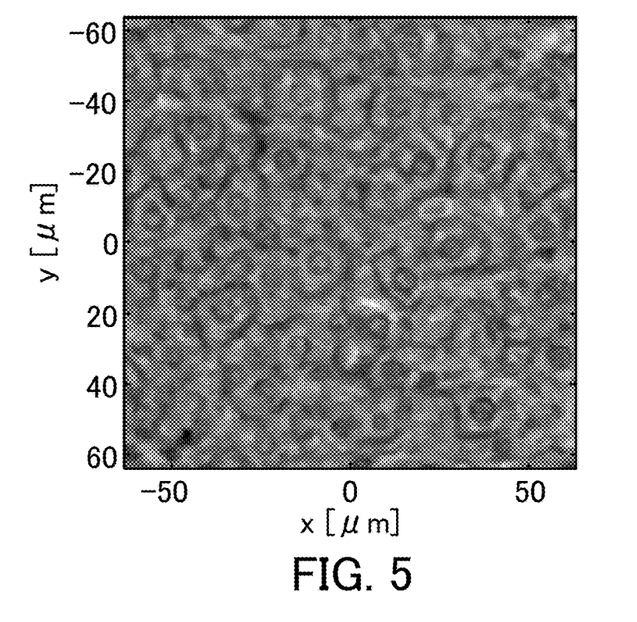
FIG. 5 is an amplitude transmittance distribution of the object.

Initially, the amplitude transmittance illustrated in FIG. 5 is set as the object used for the calculation (S1). Two orthogonal coordinates x and y are set which are perpendicular to the optical axis. Next, Δz is set (S2).

In order to set Δz, the object illustrated in FIG. 5 is captured by the optical system 104, and the image data is obtained (S201). A low-pass filter is applied which makes 0 values of the area in which the absolute value of the spatial frequency is larger than $f_{ro}$ and the deteriorated image is calculated (S202 to S204). A maximum spatial frequency determined by the sampling pitch of the image is used for an initial value of $f_{ro}$. PSNR between the deteriorated image and the pre-filtered image is calculated as an evaluated value (S205).

Herein, PSNR is a value calculated with Expressions 8 and 9, and a quantified value of the similarity of the image. PSNR has a value of 0 or higher, and the similarity of the image improves as the value of PSNR increases. In general, the image has high quality as PSNR becomes 35 [dB] or higher.

$$PSNR = 10\log_{10}\left(\frac{255^2}{MSE^2}\right) \quad \text{Expression 8}$$

$$MSE = \sqrt{\frac{\sum_{p}^{N_p}\sum_{q}^{N_q}(I(x_p, y_q) - I_{est}(x_p, y_q))^2}{N_p N_q}} \quad \text{Expression 9}$$

Herein, I(x, y) is a luminance value distribution of the true image data, $I_{est}$(x, y) is a luminance value distribution of the estimated image data, and Np and Nq are sampling numbers in the x and y directions. Expression 8 is an expression corresponding to 8-bit image.

Since calculated PSNR is higher than the reference value of 35 [dB] (S206), $f_{ro}$ is reduced (S207) and the recalculation is conducted (S203 to S205).

Figure 6:
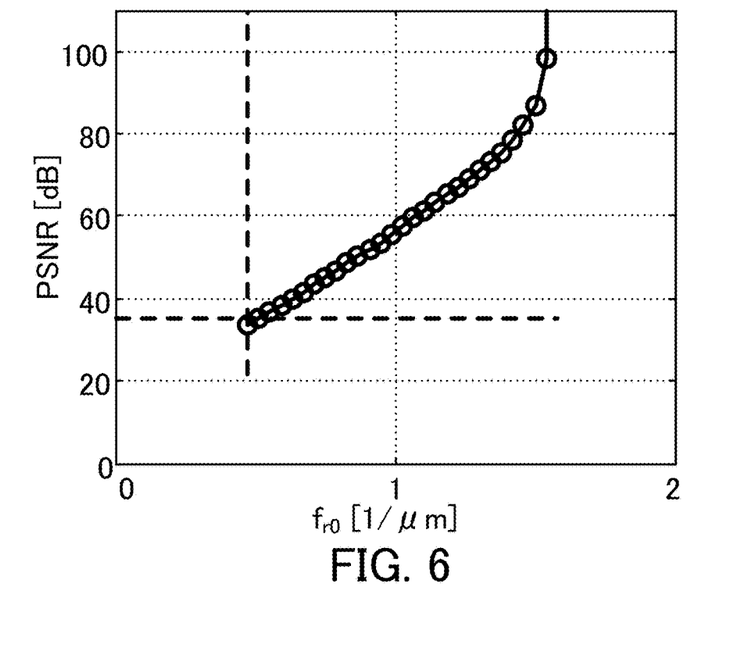
FIG. 6 is a view for illustrating a relationship between $f_{r0}$ and PSNR.

FIG. 6 illustrates PSNR (ordinate axis) to $f_{ro}$ (ordinate axis) obtained by repeating this calculation. The right end point in FIG. 6 is a result obtained by the second repetitive calculation. As $f_{ro}$ is reduced, PSNR is reduced. PSNR becomes smaller than the reference value 35 when $f_{ro}$ becomes 0.474 [1/μm].

Assume that the transverse cutoff frequency $f_{rc}$ is a value made by dividing $f_{ro}$ used for the first repetition by 2 or 0.257 [1/μm] (S208). Since obtained $f_{rc}$ is smaller than NA/λ=0.385, the longitudinal cutoff frequency $f_{zc}$ is calculated by Expression 1 (S209). As a result of the calculation, $f_{zo}$ is 0.435 [1/μm]. The image acquiring interval Δz is calculated as 11.5 [μm] based on obtained $f_{zc}$ and Expression 3 (S210).

The stacked images are obtained with calculated Δz, and stored (S3, S4). The image at the z position where the stacked images have not been obtained is estimated based on the obtained stacked images (S5 to S7).

Figure 7:
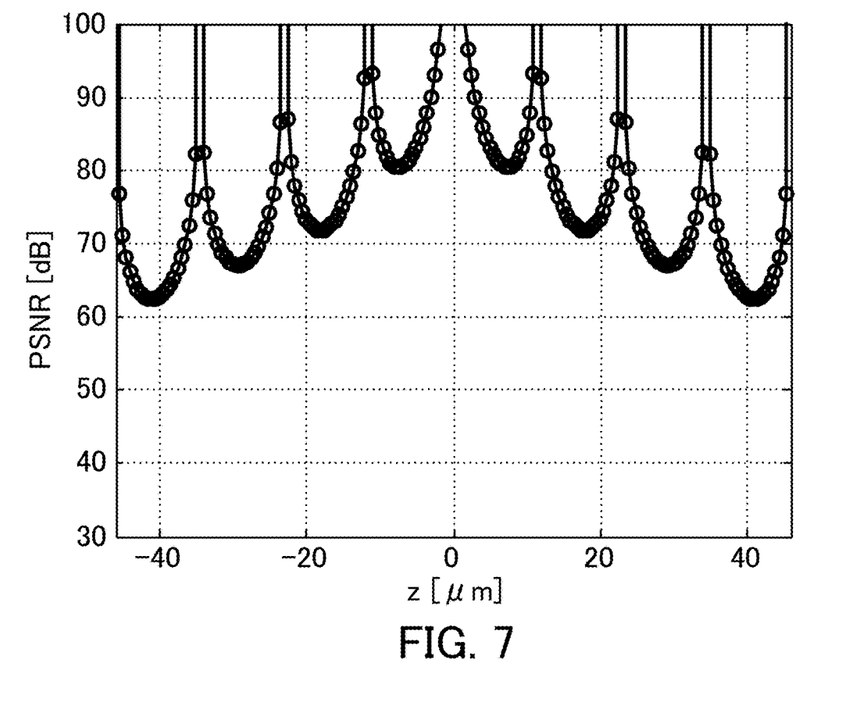
FIG. 7 is an evaluated value to an estimated result of an image.

In order to verify the effects of the image estimation, a calculation is made at 2 [μm] intervals in a focus range from −46 to 46 [μm] in which the stacked images are obtained. In order to evaluate the estimated result, PSNR is calculated between the estimated image and the true image. FIG. 7 illustrates a calculation result. The abscissa axis denotes a Z coordinate, and the ordinate axis denotes PSNR. PSNR at the image acquiring position is sufficiently larger than a value to the estimated result and thus is not displayed. From FIG. 7, PSNR is higher than 35 [dB] for all z. This means that a good quality image can be estimated at all focus positions.

Moreover, Δz=11.5 [μm] determined up to S210 is larger than a value $\lambda/2(1-(1-NA)^{1/2})$=10.2[μm] determined only by the optical theory. This means that the data capacity saving effect can be improved by utilizing the image characteristic.

This embodiment assumes the light from the object has a wavelength of 650 nm and is monochromatic, but the present invention is not limited to this embodiment. For example, a plurality of light emitting diodes may be used for an illumination and image pickup with multicolor light. A halogen lamp etc. may be used for an illumination and image pickup with light having a certain waveband. The image-pickup apparatus may obtain spectral data in a waveband.

This embodiment assumes the imaging magnification of 10 times of the image-pickup apparatus, but the present invention is not limited to this embodiment. For example, a reduction optical system may be used. The embodiment in which the image-pickup optical system is a reduction optical system and the illumination optical system is an incoherent system means that a general camera is used for image pickup. In other words, the present invention is applicable to the photography in which a general camera is used.

This embodiment does not, but may, provide image processing, such as noise reduction and correction of image stabilization for the obtained image.

This embodiment assumes that images are obtained at regular intervals, but the present invention is not limited to this embodiment. For example, Δz may be different according to the focus position while the stacked images are being obtained.

This embodiment calculates Δz from one image, but the present invention is not limited to this embodiment. One conceivable method is to obtain a plurality of images, and to set a minimum value of Δz among Δz obtained from these images.

This embodiment calculates Δz from the image of the object, but the present invention is not limited to this embodiment. Δz may be calculated by reading an image at the same site as that of the object owned by the doctor.

Δz calculated in this embodiment may be stored in the data storage with information of an observed sample, such as a site name or disease of the sample. In observing the sample of the same site or the same disease, stored Δz may be read and used. Thereby, one or more calculation(s) disclosed in this specification may be omitted. In addition, Δz calculated in this embodiment may be stored in the database with other data, such as the name of the site and disease, and communicated for use with another microscope system. The categorization method is not limited.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide an image estimating method, a non-transitory computer readable medium, and an image estimating apparatus, which can easily and precisely estimate an image at an arbitrary position with a small data amount.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The image estimating method according to the present invention is applicable to an image-pickup apparatus that captures an image of a sample using an illumination optical system, an image-pickup optical system, and a digital sensor. Therefore, the image estimating method is particularly useful for a digital microscope and a digital camera.

This application claims the benefit of Japanese Patent Application No. 2014-045803, filed Mar. 10, 2014, which is hereby incorporated by reference herein in its entirety.

What is claimed is:

1. An image estimating method configured to estimate, using image data generated by capturing an object via an image-pickup optical system at a plurality of positions that are spaced at first intervals in an optical-axis direction of the image-pickup optical system, image data at a position different from the plurality of positions, the image estimating method comprising:
   acquiring image data;
   calculating a transverse cutoff frequency in a direction perpendicular to the optical-axis direction based on the acquired image data, the transverse cutoff frequency corresponding to a permissible limit value of a spatial frequency of the acquired image data; and
   calculating the first interval based on the calculated transverse cutoff frequency.

2. The image estimating method according to claim 1, further comprising calculating a longitudinal cutoff frequency in the optical-axis direction based on the calculated transverse cutoff frequency,
   wherein the first interval is calculated based on the calculated longitudinal cutoff frequency.

3. The image estimating method according to claim 1, wherein the image data is acquired through image pickup or reading of the image data.

4. The image estimating method according to claim 1, wherein the calculating a transverse cutoff frequency includes:
   applying a filter to the acquired image data; and
   calculating an evaluated value based on the obtained image data,
   wherein the calculating a transverse cutoff frequency includes calculating, by repeating the applying a filter to the acquired image data and the calculating an evaluated value while changing a characteristic of the filter, a minimum value of a cutoff frequency of the filter when the evaluated value is equal to or higher than a reference value representative of a permissible value of quality of estimated image data as the transverse cutoff frequency.

5. The image estimating method according to claim 4, wherein the filter attenuates a spectrum of the image data in a region in which an absolute value of a spatial frequency of the image data is higher than a first value, and changing the characteristic of the filter changes the first value, the transverse cutoff frequency being calculated by the first value.

6. The image estimating method according to claim 5, wherein the transverse cutoff frequency at which the evaluated value is equal to the reference value is calculated by an interpolation method.

7. The image estimating method according to claim 2, wherein the calculating a longitudinal cutoff frequency includes calculating $f_{zc}$ by solving, when the $f_{rc}$ is smaller than NA/λ:

$$f_{zc} = \frac{\sqrt{1-(f_{rc}\lambda - NA)^2} - \sqrt{1-NA^2}}{\lambda}$$

where NA is a numerical aperture of the image-pickup optical system, λ is a wavelength of light from the object, $f_{rc}$ is the transverse cutoff frequency, and $f_{zc}$ is the longitudinal cutoff frequency, and
by solving, when the $f_{rc}$ is equal to or larger than NA/λ:

$$f_{zc} = \frac{1-\sqrt{1-NA^2}}{\lambda}.$$

8. The image estimating method according to claim 2, wherein the calculating a longitudinal cutoff frequency includes calculating $f_{zc}$ by solving, when $f_{rc}$ is smaller than NA/λ:

$$f_{zc} = NAf_{rc} - \frac{\lambda f_{rc}^2}{2}$$

where NA is a numerical aperture of the image-pickup optical system, λ is a wavelength of light from the object, $f_{rc}$ is the transverse cutoff frequency, and $f_{zc}$ is the longitudinal cutoff frequency, and
by solving, when $f_{rc}$ is equal to or larger than NA/λ:

$$f_{zc} = \frac{NA^2}{2\lambda}.$$

9. The image estimating method according to claim 1, wherein the first interval is selected in a range determined by an upper limit calculated by the transverse cutoff frequency and a lower limit calculated by multiplying the upper limit by 30%.

10. The image estimating method according to claim 1, further comprising storing, in a database, information of the first interval that has been calculated.

11. A non-transitory computer readable medium configured to store a program that enables a computer to execute an image estimating method configured to estimate, using image data generated by capturing an object via an image-pickup optical system at a plurality of positions that are spaced at first intervals in an optical-axis direction of the image-pickup optical system, image data at a position different from the plurality of positions, wherein the image estimating method includes:
acquiring image data;
calculating a transverse cutoff frequency in a direction perpendicular to the optical-axis direction based on the acquired image data, the transverse cutoff frequency corresponding to a permissible limit value of a spatial frequency of the acquired image data; and
calculating the first interval based on the calculated transverse cutoff frequency.

12. An image estimating apparatus comprising a processor configured to execute an image estimating method configured to estimate, using image data generated by capturing an object via an image-pickup optical system at a plurality of positions that are spaced at first intervals in an optical-axis direction of the image-pickup optical system, image data at a position different from the plurality of positions, wherein the image estimating method includes:
acquiring image data;
calculating a transverse cutoff frequency in a direction perpendicular to the optical-axis direction based on the acquired image data, the transverse cutoff frequency corresponding to a permissible limit value of a spatial frequency of the acquired image data; and
calculating the first interval based on the calculated transverse cutoff frequency.

* * * * *